Patented Apr. 16, 1946

2,398,662

UNITED STATES PATENT OFFICE 2,398,662

COMPASS FLUID

John D. Morgan, South Orange, and Russell E. Lowe, East Orange, N. J., assignors to Cities Service Oil Company, New York, N. Y., a corporation of Pennsylvania No Drawing. Application November 13, 1944, Serial No. 563,322

6 Claims. (Cl. 252—78)

This invention relates to improved liquid compositions having relatively small viscosity changes when subjected to relatively great changes in temperature. More particularly, the invention relates to improved liquid compositions especially adapted for use as compass fluid and for similar purposes in various instruments and apparatus which are used over wide atmospheric temperature ranges.

Various compositions have been developed for use as compass fluids and for inclinometers, etc., but many of these contain various alcohols in combination with each other and with other ingredients. Mineral spirits, xylene, and certain other oils have also been used in such compositions. Some of these compass fluids serve very satisfactorily for ships' compasses which are usually not subjected to great extremes of temperature. However, compasses for aircraft must be provided with a compass fluid which will have a satisfactory viscosity over a wide temperature range and, for example, from 100° F. to minus 70° F.

The primary object of the present invention, therefore, is to provide an improved composition which is particularly adapted for use over the wide temperature range referred to.

A further object of the invention is to provide a compass fluid which has a relatively small viscosity change over the wide temperature range encountered by aircraft.

Another object of the invention is to provide an improved composition suitable for use as a compass fluid and for similar purposes and which has a low viscosity change in the atmospheric temperature ranges encountered by aircraft.

We have discovered that a mixture comprised essentially of substantial proportions each of 1-nitropropane, ethyl silicate, $(C_2H_5)_4SiO_4$, and pseudo-cumene is a clear stable solution having a low viscosity change with changes in temperature, and that is suitable as a compass fluid.

The features of our invention are illustrated below in connection with a specific example in which the proportions of the ingredients of the composition are by volume.

According to the present invention, the compass fluid is made by simply mixing the ingredients in the following proportions, all ingredients being dry:

| | Parts |
|---|---|
| 1-nitropropane | 50 |
| Ethyl silicate | 20 |
| Pseudo-cumene fraction | 30 |

This composition has the following properties:

| | |
|---|---|
| Specific gravity at 60° F | 0.955 |
| Flash point, TAG open cup _____°F | 124 |
| Boiling point _____°F | 272 |
| Viscosity in centistokes—at | |
| 100° F | 0.78 |
| Minus 40° F | 3.30 |
| Minus 70° F | 6.25 |
| Minus 81.4° F | Clear and fluid |

Pour point—estimated at below minus 120° F.
Copper corrosion—none in one week.

The 1-nitropropane used in the composition should be as pure as reasonably possible and should especially be free of nitrous compounds. Commercial 1-nitropropane may be used if it is purified. Some commercial products have a strong yellow color which is undesirable and these are usually corrosive to copper. The yellow commercial nitropropane may be purified by agitating it strongly for two minutes with one-half its volume of an aqueous solution containing 12% of sodium sulfite and 1% of sodium bicarbonate by weight. The aqueous layer is settled and discarded and the operation repeated until the aqueous wash layer is substantially colorless. This may take as many as five washings. After this washing treatment the 1-nitropropane is dried by percolating it through anhydrous granulated calcium chloride of about four mesh. The nitropropane is now ready for use and should have a specific gravity of about 1.003.

The ethyl silicate should be colorless, absolutely dry, and have a specific gravity of about 0.9356.

The pseudo cumene ingredient should be a refined, dry, water white product. We have found that a commercially available cut of coal tar distillation, known as "cumene fraction," serves entirely satisfactorily in the making of our compass fluid. This cut consists essentially of a mixture of tri-methyl benzenes in which pseudo cumene predominates, as is indicated by the fact that about 50% of the product passes over between 169° and 171° C. in fractional distillation, with 95% distilling between 165° and 175° C. The technical grade or pure pseudo-cumene (1-2-4-tri-methyl benzene) having a boiling point of 169.8° C. may, of course, be employed in place of the pseudo cumene fraction which is identified above.

All of the ingredients of the improved compass fluid should be substantially clear water-white products, so that a clear composition is obtained which will not interfere in any way with visibility of the notations on the compass or other instruments in which the fluid is used.

The proportions of the ingredients used in the improved composition may be varied to a limited extent to provide fluids for special applications. The specific proportions given above provide a compass fluid of ideal properties for use over atmospheric temperature ranges encountered by aircraft. When the composition is used for other purposes, the proportion of 1-nitropropane may vary from 45% to 55%; the ethyl silicate from 17% to 23% and the pseudo cumene fraction from 26% to 34%. Other modifications may be made in the composition by those skilled in the art without departing from the spirit and scope of the invention as defined by the appended claims.

Having described the invention in its preferred form, what is claimed as new is:

1. A compass fluid which is liquid and free-flowing at temperatures below minus 80° F. and which has a relatively small viscosity change over the atmospheric temperature range at which aircraft operate, consisting essentially of a mixture of approximately 50 parts by volume of 1-nitropropane, 20 parts by volume of ethyl silicate, and 30 parts by volume of a pseudo cumene fraction.

2. A compass fluid consisting essentially of a mixture of approximately 50 parts by volume of 1-nitropropane, 20 parts by volume of ethyl silicate, and 30 parts by volume of pseudo cumene.

3. A liquid composition, having a relatively small viscosity change over the temperature range of from minus 70° F. to 100° F., consisting essentially of a homogeneous mixture of from 45–55 parts of 1-nitropropane, from 17 to 23 parts of ethyl silicate, and from 26 to 34 parts of pseudo cumene, in which said parts are by volume.

4. A fluid composition consisting essentially of a substantially colorless anhydrous homogeneous mixture of approximately 50 parts by volume of 1-nitropropane, 20 parts by volume of ethyl silicate, and approximately 30 parts by volume of a pseudo cumene hydrocarbon fractional distillate.

5. A fluid composition which is non-corrosive to copper consisting essentially of a homogeneous anhydrous mixture of 1-nitropropane, ethyl silicate, and a pseudo cumene hydrocarbon fraction in such proportions as to have a viscosity at 100° F. of approximately 0.78 centistoke, and a viscosity at minus 40° F. of approximately 3.30 centistokes.

6. A compass fluid consisting essentially of a substantially colorless homogeneous anhydrous mixture of from 45 to 55 parts by volume of 1-nitropropane, from 17 to 23 parts by volume of ethyl silicate, and from 26 to 34 parts by volume of a pseudo cumene fraction.

JOHN D. MORGAN.
RUSSELL E. LOWE.